Dec. 20, 1960  C. MARCHETTI  2,965,185
MOTOR VEHICLES

Filed Jan. 12, 1959  6 Sheets-Sheet 1

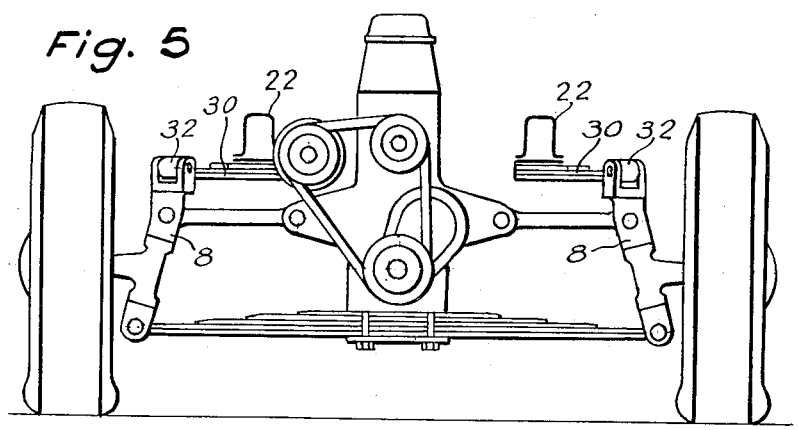
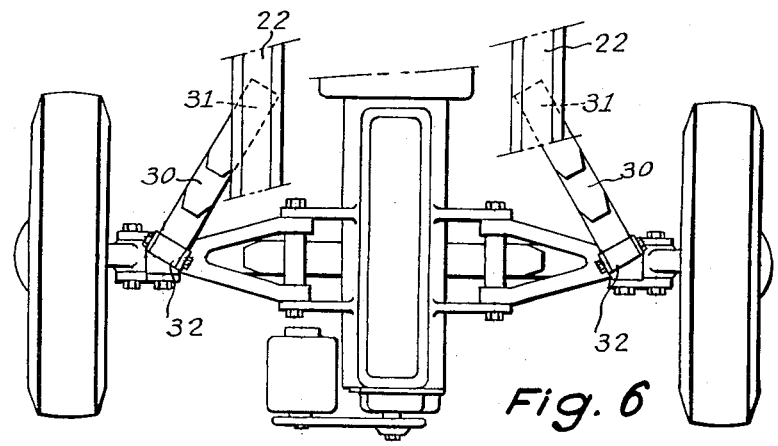
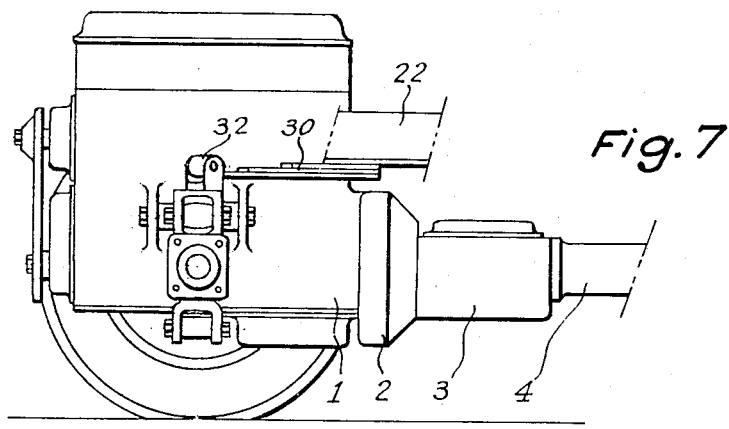

Dec. 20, 1960    C. MARCHETTI    2,965,185
MOTOR VEHICLES

Filed Jan. 12, 1959    6 Sheets-Sheet 5

United States Patent Office 2,965,185
Patented Dec. 20, 1960

2,965,185

MOTOR VEHICLES

Carlo Marchetti, Paris, France, assignor to Societe Industrielle de Mecanique et Carrosserie Automobile-Simca, Paris, France, a French company Filed Jan. 12, 1959, Ser. No. 786,203

Claims priority, application France Jan. 18, 1958

9 Claims. (Cl. 180—55)

This invention relates to the construction of motor vehicles. Objects of the invention include the provision of improved arrangements for supporting the power-generating and power-transmitting mechanism of the vehicle with respect to the road wheels, and also for supporting the body of the vehicle with respect to the other components of it. More specific objects are to provide improved rigidity and stability in the vehicle structure coupled with smoother and more efficient transmission of power from the engine to the drive wheels as well as smoother suspension of the body to increase driving comfort.

In accordance with one aspect of the invention, there is provided a motor vehicle which includes a rigid and substantially undeformable casing structure enclosing at least a major portion of the power-generating and transmitting mechanism of the vehicle, and means yieldingly connecting said structure with the road wheel supports of the vehicle so as to permit limited relative displacement of said structure relative to said supports both vertically and in rotation about a longitudinal axis of the vehicle, but not in other directions, i.e. preventing longitudinal and lateral shifting displacements of said structure.

In accordance with another aspect, there is provided a motor vehicle which includes a rigid casing structure enclosing at least a major part of the power-generating and transmitting mechanism of said vehicle, first means yieldingly connecting said structure with road wheel supports of the vehicle to permit limited relative displacement thereof both vertically and in rotation about a longitudinal axis but not in other directions, and further means separate and distinct from said first connecting means, yieldingly connecting the body of the vehicle with said wheel supports to permit limited relative displacement thereof both vertically and in rotation about a longitudinal axis but not in other directions.

The above and further objects, aspects, features and advantages of the invention will appear from the ensuing particular description of a form of embodiment of the invention and of some modifications thereof, given by way of illustration but not of limitation with reference to the accompanying drawings, wherein:

Fig. 5 is a view similar to Fig. 3 but relating to a modified embodiment of the invention;

Fig. 6 is a plan view of Fig. 5;

Fig. 7 is a side view thereof;

Figure 1:
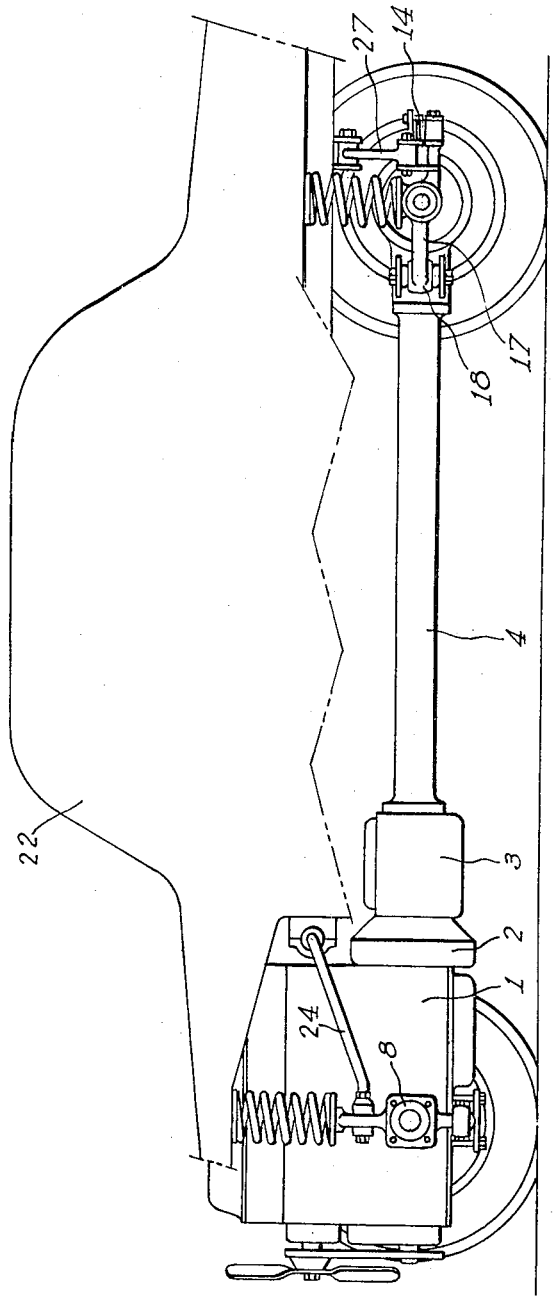
Fig. 1 is a side view of a motor-car constructed in accordance with a first embodiment of the invention, with part of the body shown in simplified outline and partly broken away to illustrate the components relevant to the invention.

Referring first to the embodiment shown in Figs. 1 to 4, a motor-car is shown including a motor unit 1, a clutch unit 2, a transmission gearbox unit 3, a transmission shaft unit 4, and a differential unit 5. It will be understood that each of the above enumerated units may be of conventional construction. In accordance with the invention, the casings enclosing all of the above units are rigidly or integrally interconnected with one another so as to constitute a unitary girderlike structure possessing a high degree of rigidity in all directions. In particular, the transmission shaft unit 4 is encased in a tubular casing of substantial extent having its one end rigidly secured to an end of the gearbox 3 and its other end rigidly secured to the differential gear casing 5.

The motor casing 1 has its base surface supported intermediate its ends, upon the midportion of a transversely extending laminated leaf spring 6, being secured thereto with bolts as shown. The leaf spring 6 extends across the front of the car and has its ends attached, as by the swivel connections shown, to the front wheel supports 8 upon which the wheels 13 are journalled in a conventional manner. The wheel supports are further connected with the motor unit 1 by way of a pair of links 10 having their inner ends pivoted at 11 to the sides of the motor unit and having their outer ends swivelled by way of the swivel joints 12 with upper projecting portions of the wheel supports 8. The body 22 of the vehicle is supported at the front end by way of the suspension coil springs 23 having their upper ends engaging downwardly directed surfaces of the body and having their bottom ends supported upon the wheel supports 8 above the swivel joints 12, such support being so effected as to permit angular movement of the wheel supports 8 for steering the car.

At the rear end of the structure, there is provided a laminated leaf spring 14 having its midportion secured to the differential unit 5 and having its ends pivoted at 15 to pivots projecting rearwardly from the respective rear wheel supports 16. Further, a pair of arms 17 have their inner ends pivoted at 18 to brackets projecting from the transmission shaft casing 4 near the differential unit 5, and have their outer ends secured rigidly to the wheel supports 16.

The drive torque is transmitted from the output shafts of the differential unit 5 to the wheels 19 by way of the pair of axles 20 having the wheels secured on their outer ends and connected by way of Cardan joints 21 to the outputs of the differential.

Figure 2:
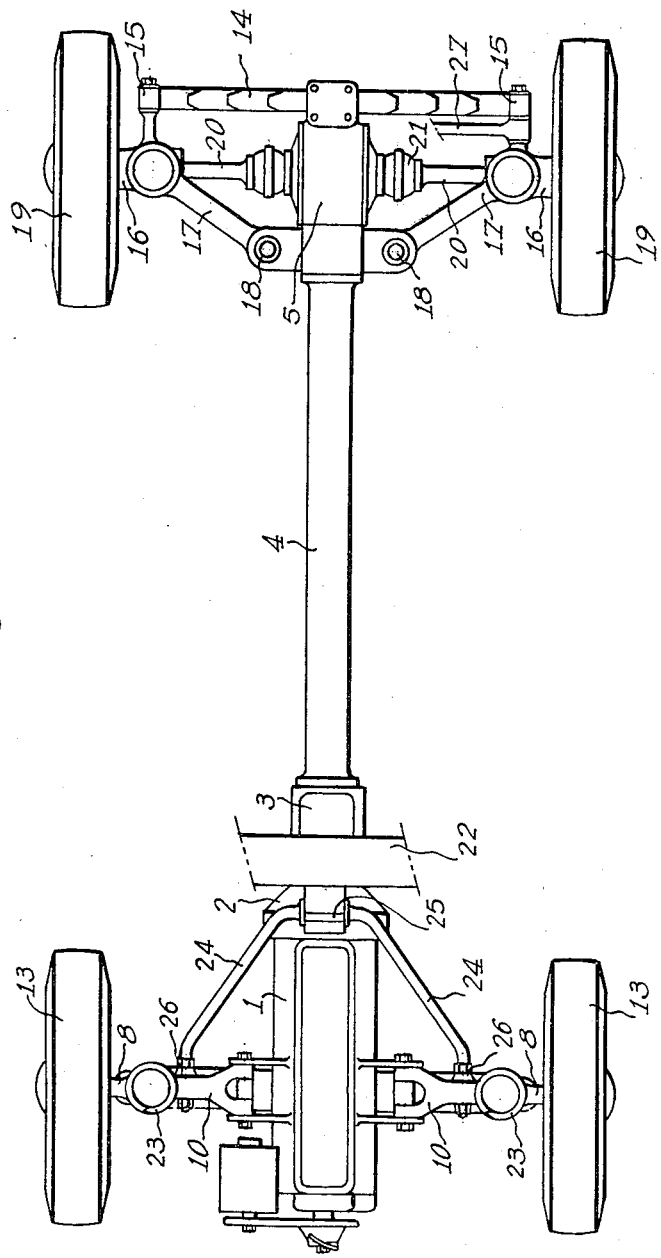
Fig. 2 is a plan view of the structure of Fig. 1.
Figure 3:
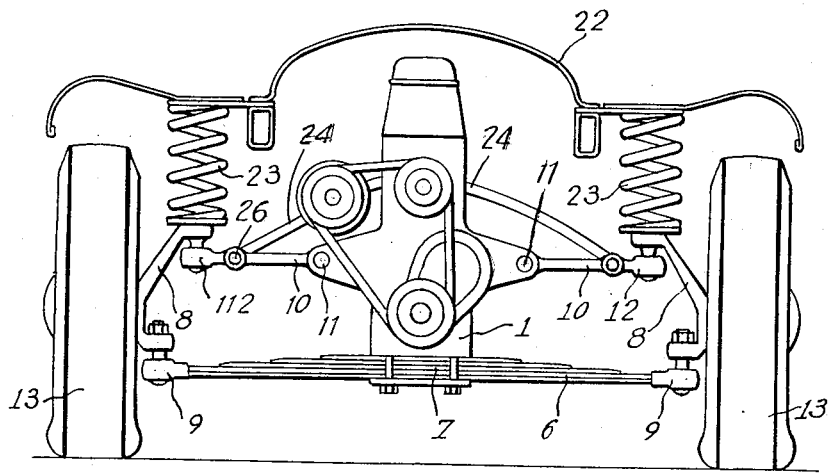
Fig. 3 is a front view of the structure of Figs. 1 and 2, illustrating the front axle and suspension means.
Figure 4:
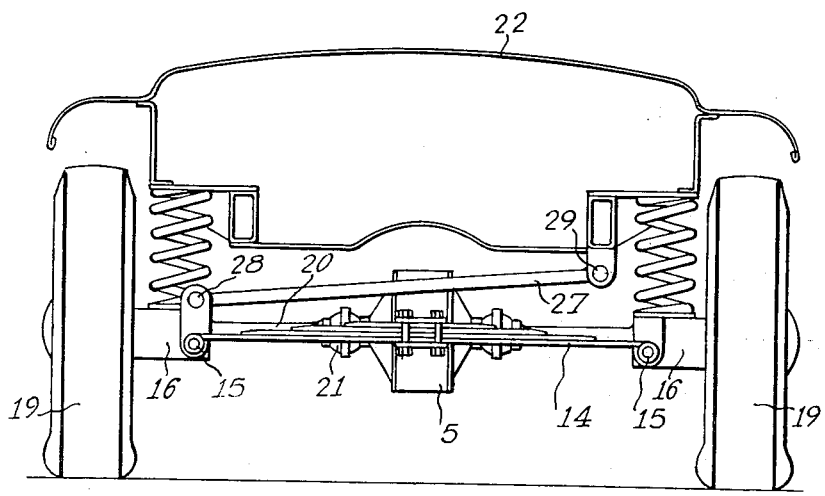
Fig. 4 is a similar view relating to the rear axle and rear suspension means.

In the particular embodiment shown in Figs. 1 to 4, the body 22 of the car is further connected to the front end of the supporting structure by way of a bracket 24 in the general shape of a V so as to provide two diverging arms as shown, the midportion of the V being freely pivoted in a suitable bearing 25 provided on the body of the car above the unitary casing structure, as particularly apparent from Fig. 2, and having its ends pivoted at 26 to the links 10. Thus it will be seen that the V-shaped connecting bracket ensures lateral stability of the body with respect to the wheels at the front end of the vehicle, and simultaneously provides longitudinal stability of the body with respect to the wheels. Lateral stability of the body with respect to the wheels at the rear end of the vehicle is ensured by a link 27 which is pivotally connected at its opposite ends to one of the rear wheel supports 16 and to the body 22, as at 28 and 29, respectively (Fig. 4).

In the modified embodiment shown in Figs. 5, 6 and 7, parts corresponding to parts shown in the first embodiment have been designated by the same reference numbers nor will they be again described since the general arrangement is similar. However, at the front end of the car, instead of the pivoted V-bracket 24, a yielding connection is here provided between the body of the car and the front wheels, said connection comprising a pair of angularly extending laminated leaf springs 30 having their stiffer large sized ends 31 secured to the body 22 of the car and their thinner and more flexible outer ends attached at 32 to the related wheel journal supports 8. It will be understood that the pair of springs 30 perform herein a stabilizing function corresponding to that accomplished by the pivoted V-bracket 24 in the first embodiment.

Figure 8:
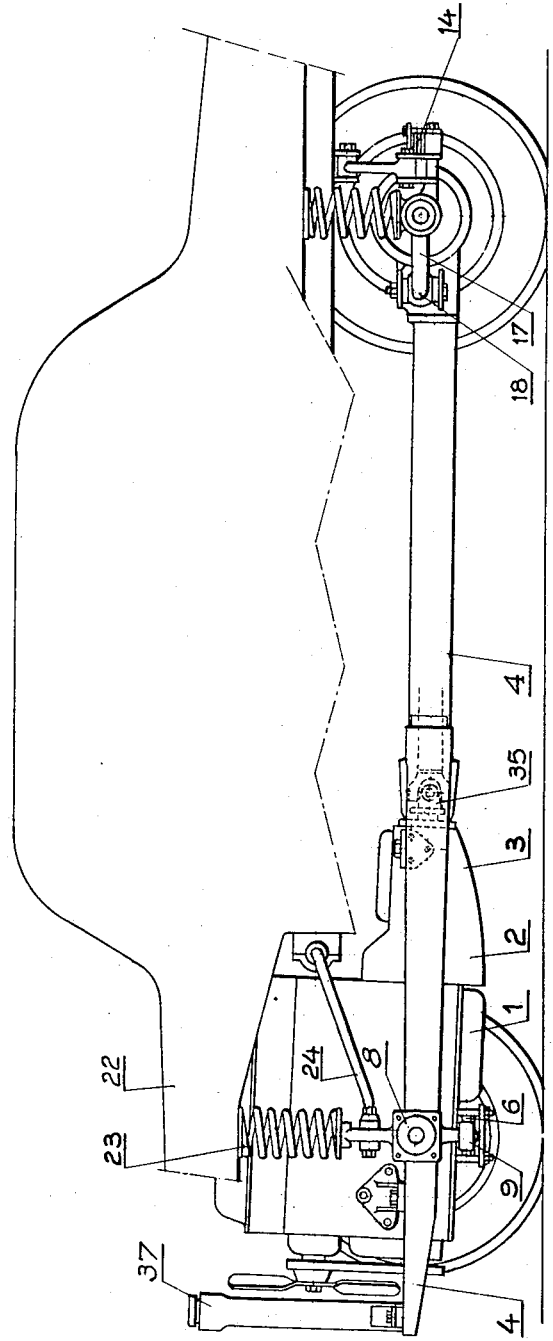
Fig. 8 is similar to Fig. 1 but illustrates a third modification of the invention.
Figure 9:
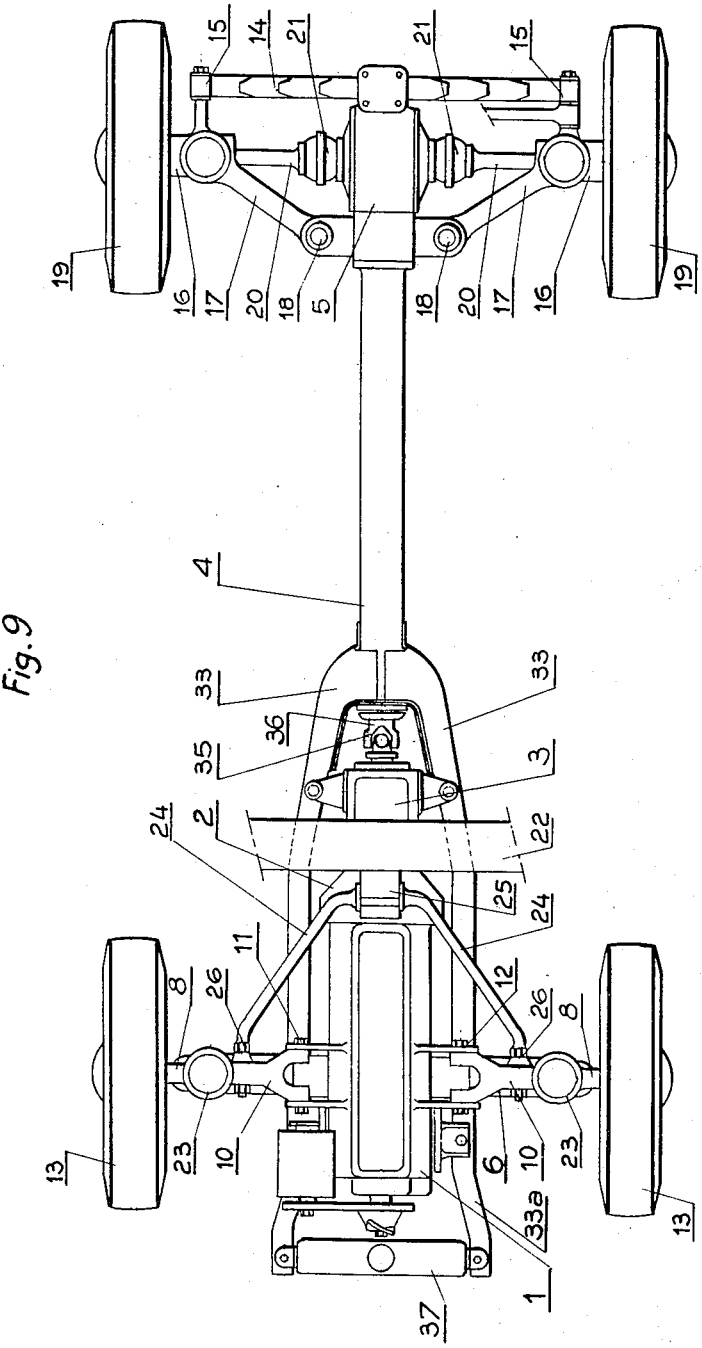
Fig. 9 is a plan view corresponding to Fig. 8.

In the further variant illustrated in Figs. 8 and 9, the rigid unitary casing structure enclosing the drive generating and transmitting components of the vehicle, is constructed in a somewhat modified manner. That is, instead of the forward end of the transmission shaft casing 4 being directly secured to the casing 3 of the gearbox as in the first two constructions described, said shaft casing 4 is herein formed with two diverging ends 33 which first diverge at an angle from each other and thereafter assume parallel directions in spaced relationship, with the motor, clutch and gearbox assembly being supported between said arms. The gearbox casing 3 has bracket arms extending from its sides which are rigidly secured, e.g. bolted, to the diverging arms 33, and the output shaft from the gearbox is connected with the transmission shaft 36 in casing 4 by way of a Cardan joint 35, thereby permitting a tilting of the motor unit relatively to the tubular casing 4. The arms 33 project forwardly beyond the end of the motor 1 as indicated at 33a and support the radiator 37 at their ends. Suitable means are provided for connecting the motor 1 and clutch 2 to the arms 33.

It will be understood that various modifications may be made in the exemplary constructions illustrated and described. Thus, features shown in connection with one embodiment may be associated with features shown in connection with another embodiment, where the structural requirements permit, as will be apparent to those familiar with the art.

What I claim is:

1. In an automotive vehicle, in combination, a motor adjacent one end of the vehicle, independent wheel supports, road wheels journalled in said supports and including drive wheels adjacent the other end of the vehicle, transmission mechanism connected with said motor and drive wheels to transmit drive torque from the former to the latter and including a transmission shaft extending longitudinally of the vehicle, a casing for said motor, further casing means for said mechanism including a tubular casing surrounding said shaft, means interconnecting said casing and said further casing means into a substantially undeformable rigid structure, yielding means connecting said structure with said wheel supports comprising a horizontal, transversely extending, vertically flexible, spring having opposite ends attached to said wheel supports at said one end of the vehicle and having a midportion attached in supporting relation with said structure adjacent said motor, and a further horizontally transversely extending, vertically flexible, spring having opposite ends attached to said drive wheel supports at said opposite end of the vehicle and having a midportion attached in supporting relation with said structure adjacent the related end of said tubular casing, a body, and independent spring means between each of said wheel supports and said body for supporting the latter from said wheel supports.

2. In an automotive vehicle, in combination, a motor adjacent one end of the vehicle, independent wheel supports adjacent the opposite ends of the vehicle, road wheels journalled in said supports and including a pair of drive wheels adjacent the end of said vehicle remote from said motor, transmission mechanism for transmitting a drive torque from said motor to said drive wheels and including a transmission shaft having one end connected with said motor for rotation thereby, and further including differential gearing having an input shaft connected with the other end of said transmission shaft for rotation thereby and having two output shafts respectively connected with said drive wheels for rotating the latter, a casing for said motor, further casing means for said transmission mechanism including a tubular casing means surrounding said shaft and a differential casing means for said gearing, means interconnecting said casing and said further casing means into a substantially undeformable structure, yielding means connecting said structure with said wheel supports comprising a first horizontal transverse vertically flexible spring having ends attached to said wheel supports adjacent said one end of the vehicle and having a midportion attached to said motor casing, and a second horizontal transverse vertically flexible spring having ends attached to said drive wheel supports adjacent the other end of the vehicle and having a midportion attached to said differential casing, whereby to permit limited displacement of said structure relative to said wheel supports vertically and in rotation about a longitudinal axis of the vehicle but not in other directions, a body, and individual springs between each of said wheel supports and said body for supporting the latter from said wheel supports.

3. In an automotive vehicle, the combination as in claim 2, further comprising a pair of links having their one ends pivoted to opposite sides of said motor casing and having their other ends pivoted to said wheel supports adjacent said one end of the vehicle.

4. In an automotive vehicle, the combination as in claim 2, further comprising a pair of links having their one ends pivoted to opposite sides of said further casing means adjacent said differential gear and having their other ends attached to said drive wheel supports.

5. In an automotive vehicle, the combination as in claim 2, wherein said tubular casing has a pair of arms projecting forklike from one end thereof to encompass said motor therebetween, and means securing opposite sides of the motor casing with said arms whereby to provide said substantially undeformable structure.

6. In an automotive vehicle, the combination as in claim 5, wherein said further casing means further includes a gearbox casing secured to an end of the motor casing, and means securing opposite sides of said gearbox casing to said arms.

7. In an automotive vehicle in combination a body, a motor, independent wheel supports, road wheels including a pair of drive wheel individually journalled in said supports, transmission mechanism for transmitting a drive torque from said motor to said drive vehicles, a motor casing, further casing means for at least part of said transmission mechanism, means interconnecting said motor casing and said further casing means into a rigid structure extending substantially longitudinally of the vehicle, yielding means independently connecting said structure with each of said wheel supports to provide an independently sprung suspension for each of the latter and to permit limited displacement of said structure relative to said supports both vertically and in rotation about a longitudinal axis of the vehicle but not in other directions, resilient means connecting said body independently with each of said wheel supports to permit limited displacement of said body relative to each of said supports both vertically and in rotation about a longitudinal axis of the vehicle parallel to said first longitudinal axis, and further means connecting said body with said wheel supports to prevent movement of said body relative to said wheel supports in directions other than vertically and about said longitudinal axis.

8. In an automotive vehicle, the combination as in claim 7, wherein said further connecting means include a generally V-shaped frame having a central portion thereof connected for rotation relative to said body about an horizontal axis and having spaced end portions rotatably connected to wheel supports at one end of the vehicle.

9. In an automotive vehicle, the combination as in claim 7, wherein said resilient means include a pair of leaf springs having their one ends attached to said body and their other ends attached to said wheel supports.

References Cited in the file of this patent

UNITED STATES PATENTS

| | | |
|---|---|---|
| 1,524,955 | Stahl | Feb. 3, 1925 |
| 2,081,965 | Trott | June 1, 1937 |
| 2,214,456 | Ford | Sept. 10, 1940 |
| 2,373,356 | Thoms et al. | Apr. 10, 1945 |
| 2,756,835 | Muller | July 31, 1956 |

FOREIGN PATENTS

| | | |
|---|---|---|
| 179,559 | Great Britain | of 1923 |